June 29, 1937. W. I. TAYLOR 2,085,052
PRODUCTION OF POROUS MATERIALS
Original Filed March 21, 1933
FIG_1_
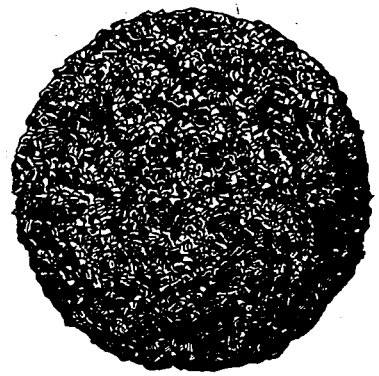
FIG_2_
Inventor:
William I. Taylor
by
Attorneys Patented June 29, 1937

2,085,052

UNITED STATES PATENT OFFICE 2,085,052

PRODUCTION OF POROUS MATERIALS

William Ivan Taylor, Spondon, near Derby, England, assignor to Celanese Corporation of America, a corporation of Delaware Application March 21, 1933, Serial No. 661,937
In Great Britain April 9, 1932. Renewed November 21, 1934

11 Claims. (Cl. 18—48)

This invention relates to the production of porous materials and more particularly to the production of porous materials comprising derivatives of cellulose.

It has been found that porous masses of cellulose esters or ethers or of compositions containing such esters or ethers are of great value. Such porous masses are not only light in weight, but have a high heat and sound insulating capacity. Furthermore, by suitably varying the constituents of the masses and/or by after-treatments of the cellulose derivatives, masses may be obtained of widely varying characteristics for example in respect of hardness or resiliency. The porous masses of cellulose esters or ethers, unlike natural organic fibrous products, are furthermore resistant to fungoid growth, and when of no further use for their original purpose may be melted down or dissolved in suitable solvents and the cellulose derivative recovered for further use.

The present invention therefore comprises porous masses of cellulose esters or ethers or of compositions comprising such esters or ethers.

The porous masses may be prepared in various ways for example by forming a cellulose ester or ether-containing mass having distributed therein particles or pieces of a suitable solid or globules of a suitable liquid and thereafter removing the said solid or liquid. Again, gas bubbles may be introduced into or formed in a fluid or semi-fluid mass of a cellulose ester or ether composition and the latter subsequently caused to set, for example by cooling or removal of solvent if present.

Examples of cellulose esters and ethers which may be employed in the production of the masses of the present invention are cellulose acetate, cellulose formate, cellulose propionate, cellulose butyrate, or other organic ester of cellulose, or inorganic esters of cellulose such for example as nitrocellulose, or ethyl cellulose, benzyl cellulose, or other cellulose ether.

One convenient method of preparing the porous masses of the present invention is to dissolve the cellulose derivative in an organic solvent, the amount of solvent being preferably restricted in order to produce a viscous solution. A solid, liquid or gas insoluble in the solvent may then be dispersed in the solution and the volatile solvent evaporated or the solution set in a coagulating bath. The dispersed substance may then if necessary be extracted or decomposed when a porous mass is obtained.

Examples of materials insoluble in organic solvents which may be employed are rock salt, sodium sulphate, sodium borate, sodium carbonate, ammonium carbonate, sodium sulphite or bisulphite, magnesium sulphate, or other salts or compounds. The size of the particles of insoluble materials may be varied according to the size of the pores of the porous material that is required. Thus particles may be employed for example of $\frac{1}{16}$ to $\frac{1}{4}$ inch or more in diameter. It is preferred to employ, especially when setting is accomplished by evaporation of solvent, particularly at high temperatures, substances which do not contain a high proportion of water of crystallization.

The above and other water-soluble substances may be removed from the masses by treatment with water or other aqueous liquid.

Conveniently the setting of the cellulose derivative solution and the removal of the particles or pieces of removable material disposed therein may be effected in a single operation, for example by treatment with water or other aqueous liquid. Thus a mass may be prepared by mixing a cellulose derivative solution containing a water soluble solvent with rock salt or other water-soluble substance insoluble therein and after bringing to the desired shape, treated with water or other aqueous liquid until the coagulation of the mass and removal of the salt has been effected.

The invention is not, however, restricted to the simultaneous coagulation of the cellulose derivative and removal of the solids as these operations may, if desired, be effected separately. Thus a solution of cellulose acetate in acetone may be coagulated in a setting bath containing hydrocarbons, and the dispersed solid then removed by extraction with water or other aqueous liquids.

Again, a gas may be introduced directly into a liquid or semi-liquid mass containing the cellulose derivative. Thus fine bubbles of gas may be bubbled rapidly into a viscous solution of cellulose acetate, or into a melted cellulose acetate composition, and the mass set by coagulation or cooling respectively. It has been found convenient to produce the gas actually in the mass by the decomposition of a solid dispersed therein and which may be decomposed to yield a gas. Thus for example a carbonate, such for example as sodium or calcium carbonate, or other compound which may be decomposed to yield a gas may be incorporated in the cellulose derivative solution, and the solution set. The solid mass, preferably before complete hardening, may then be treated with dilute hydrochloric acid, when the carbon dioxide liberated forms pores throughout the material, the chloride formed being afterwards removed by extraction with water. If desired the setting and gas liberation may be effected in a single operation by the aid of aqueous acid. The particles employed in this process may be much smaller than the pores which it is desired to form in the cellulose derivative masses. In the production of porous cellulose ester masses this method for the production of porous masses permits the formation of the masses directly from the esterification liquor. Thus for example finely divided sodium or calcium carbonate may be mixed rapidly into a concentrated solution of cellulose acetate in acetic acid as directly obtained by acetylation of cellulose, the mass being then immersed in water. The carbonate is decomposed with liberation of carbon dioxide during the process and a porous mass may thus be produced.

Examples of solvents suitable for use in the production of the cellulose derivative solutions are acetone, methyl acetate, alcohol, benzene, methyl ethyl ketone, or ethylene dichloride, alone or in admixture with each other, or with other volatile or less volatile solvents in which the selected cellulose derivative is soluble.

The extracting agent employed for extracting or decomposing the solid or liquid from the mass may contain a solvent or swelling agent for the cellulose derivative in the mass to assist the penetration of the extracting or decomposing agent into the mass.

By reducing the external pressure before complete setting of a cellulose derivative mass containing gas bubbles, the pores may be enlarged. Reduction of pressure is of particular value where the gas bubbles are introduced directly or are produced by the decomposition of solid or liquid particles in the mass.

According to another method of preparing the masses of the present invention, instead of dissolving the cellulose derivative, it may be worked up on rolls or the like with the insoluble substance and solvents and the like, for instance as in the celluloid industry. When necessary the insoluble substance may then be extracted or decomposed before, at the same time as, or after removal of solvent and a porous mass obtained.

Porous masses consisting essentially of cellulose derivatives prepared by these methods may be obtained with a specific gravity as low as 0.14 to 0.18 and in a form which is pumice-like to the touch.

Where it is desired to modify the properties of the final product, any other desired substances may be incorporated in the initial composition. Thus for example plasticizers, high boiling solvents, pigments or other effect materials, fire retardants, fillers or any other desired substances may also be incorporated in the masses of the present invention. Suitable plasticizers for use in accordance with the present invention are diphenylol propane, relatively non-volatile tartrate and phthalic esters, e. g. diamyl tartrate, dibutyl tartrate, dibutyl phthalate, diethyl phthalate or dimethyl phthalate, aromatic phosphates, for example triphenyl phosphate or tricresyl phosphate, triacetin, and the aromatic sulphonamides, especially the N-alkyl aromatic sulphonamides such for example as xylene monomethyl sulphonamides. Examples of higher boiling solvents which may be employed are diacetone alcohol, the methyl ether of ethylene glycol, dioxane and ethyl lactate, whilst among fire retardants particular mention may be made of the brominated aromatic compounds, e. g. brominated tricresyl phosphate or tribromacetanilide. The strength of the compositions may also be increased by incorporating suitable fibrous fillers, such for example as hemp, in the compositions from which they are prepared.

Natural or synthetic resins may also be incorporated in the composition, particularly where a harder product is required. Examples of resins suitable for incorporation are the phenol-aldehyde and phenol-ketone resins, e. g. phenol-formaldehyde resins, diphenylol propane-formaldehyde or -ketone resins, phenol-furfural resins, aromatic sulphonamide-aldehyde resins, benzophenone-aldehyde resins, and the polymerized vinyl resins.

An especially rubbery material may be obtained by dissolving the cellulose derivative in a mixed solvent containing a constituent soluble in a precipitating liquid subsequently to be employed and a constituent insoluble in that precipitating liquid together with plasticizers and the insoluble substance and coagulating the mass. Thus for example cellulose acetate may be dissolved in a mixture of acetone and ether or other mixed solvent, one constitutent of which is immiscible with water, dibutyl phthalate added as plasticizer and calcium carbonate or other water-insoluble carbonate suspended in the solution. The solution is then coagulated by means of water and treated with dilute hydrochloric acid, after which it is repeatedly washed with water to remove calcium chloride.

The porous masses of the present invention may by made in any convenient shape or size. Thus, for example, they may be prepared in the form of blocks or slabs e. g. for constructional purposes, while larger masses may be cut to form smaller masses of any desired shape. Not only may the masses be cut to any desired shape, however, but they may be prepared in moulds so that they are formed directly in the shape finally desired.

The porous masses of the present invention may be coloured and/or subjected to any desired after-treatment. Thus for example where a water-proof material is desired, the surface may be coated, or the surface pores closed, with a cellulose derivative or resin composition, the cellulose derivative or resin of which possesses solubility characteristics different from those of the cellulose derivative in the porous mass, and may therefore be applied dissolved in a solvent which has substantially no solvent action for the cellulose derivative of the porous mass.

As has been indicated the porous products of the present invention, unless their properties have been modified by the action of plasticizers, are, in general, pumice-like to the touch. Where the masses are obtained from cellulose esters they may be partially or completely saponified for example by treating with 10% caustic soda or with some other saponifying agent for a considerable period of time, for example twenty-four hours. The mass so obtained swells on immersion in water and forms an excellent substitute for sponges.

Because of their low specific gravity the porous masses of the present invention are, especially when sealed with a water-proof surfacing composition, very suitable for use in the construction of objects required to float on water, e. g. life-saving belts and rafts and the like. Other uses for which the masses may be used have already been indicated. Thus for example they may be used for constructional purposes, as substitutes for rubber, and for sponges, and for a great variety of other purposes where one or more of the properties of low specific gravity and a high degree of heat and sound insulation are of advantage.

In the accompanying drawing, Figure 1 shows a sponge consisting of a porous mass of completely saponified cellulose acetate, whilst Figure 2 shows a slab of porous material consisting of unsaponified cellulose acetate such as would be suitable for use for constructional purposes.

The following example illustrates the invention without being in any way limitative:—

*Example*

400 parts of rock salt, crushed to such a size as to pass a ¼ inch mesh but so that not more than 20% of the crushed material passes a 1/16 inch mesh, are suspended in 100 parts of an acetone solution containing 23% of cellulose acetate. The solution is dried, the temperature being raised to 100° C., and the dried mass pressed to the desired shape and extracted repeatedly with water. It is then dried once more when a hard, pumice-like structure is obtained. On saponification of this pumice-like mass by treatment for about 24 hours with 10% caustic soda a product is obtained which forms an excellent substitute for a sponge.

What I claim and desire to secure by Letters Patent is:—

1. Process for the production of sponge-like masses, which comprises saponifying a porous mass of a material containing a cellulose carboxylic ester.

2. Process for the production of sponge-like masses, which comprises dispersing in a mass containing a cellulose carboxylic ester, particles incompatible with the mass, and treating the mass so as to cause it to set, removing the dispersed particles, and saponifying the cellulose carboxylic ester.

3. Process for the production of sponge-like masses, which comprises saponifying a porous mass of a material containing cellulose acetate.

4. Process for the production of sponge-like masses, which comprises dispersing in a mass containing cellulose acetate, particles incompatible with the mass, and treating the mass so as to cause it to set, removing the dispersed particles, and saponifying the cellulose acetate.

5. Process for the production of sponge-like masses, which comprises dispersing particles of a water-soluble salt in a semi-liquid mass of cellulose acetate in a water-miscible volatile solvent, pressing the mass to the desired shape, evaporating the solvent, extracting the water-soluble salt with water, and saponifying the cellulose acetate.

6. Process for the production of sponge-like masses, which comprises dispersing particles of a water-soluble salt in a semi-liquid mass of cellulose acetate in a water-miscible volatile solvent, pressing the mass to the desired shape, evaporating the solvent, extracting the water-soluble salt with water and saponifying the cellulose acetate with a solution of caustic soda of about 10% strength.

7. Process for the production of sponge-like masses, which comprises dispersing particles of a water-soluble salt and a fibrous filler in a viscous solution of cellulose acetate in a water-miscible volatile solvent, pressing the mass to the desired shape, evaporating the solvent, extracting the water-soluble salt with water, and saponifying the cellulose acetate.

8. A sponge-like mass comprising a continuous structure of material containing a saponified cellulose carboxylic ester.

9. A sponge-like mass containing a saponified cellulose carboxylic ester and a fibrous filler.

10. A sponge-like mass comprising a continuous structure of material containing saponified cellulose acetate.

11. A sponge-like mass containing a substantially completely saponified cellulose acetate and hemp.

WILLIAM IVAN TAYLOR.